United States Patent [19]

Rückl

[11] Patent Number: 4,808,790

[45] Date of Patent: Feb. 28, 1989

[54] PROCESS AND APPARATUS FOR THE PRODUCTION OF A SCREEN PRINTING STENCIL

[75] Inventor: Siegfried Rückl, Kufstein, Austria

[73] Assignee: Schablonentechnik Kufstein Gesellschaft M.B.H., Kufstein-Schaftenau, Austria

[21] Appl. No.: 181,304

[22] Filed: Apr. 13, 1988

Related U.S. Application Data

[62] Division of Ser. No. 923,154, Oct. 10, 1986.

[30] Foreign Application Priority Data

Feb. 12, 1985 [AT] Austria .............................. A 406/85

[51] Int. Cl.$^4$ .............................................. B23K 9/00

[52] U.S. Cl. ............................ 219/121.68; 219/121.78

[58] Field of Search ....................... 219/121.67, 121.68, 219/121.69, 121.70, 121.71, 121.72, 121.78; 427/53.1

[56] References Cited

U.S. PATENT DOCUMENTS

| | | | |
|---|---|---|---|
| 3,696,742 | 10/1972 | Parts et al. | 346/76 L X |
| 3,981,237 | 9/1976 | Rhodes | 101/128.4 X |
| 3,981,237 | 9/1976 | Rhodes | 101/128.2 |
| 4,328,410 | 5/1982 | Slivinsky et al. | 219/129.67 X |
| 4,352,972 | 10/1982 | Chase | 219/121.67 |

FOREIGN PATENT DOCUMENTS

| | | |
|---|---|---|
| 0072609 | 2/1983 | European Pat. Off. . |
| 0072609A | 2/1983 | European Pat. Off. . |
| 1671630 | 9/1971 | Fed. Rep. of Germany . |
| 1671630 | 9/1971 | Fed. Rep. of Germany . |
| 2042985 | 10/1980 | United Kingdom . |
| 2042985A | 10/1980 | United Kingdom . |

*Primary Examiner*—C. L. Albritton
*Attorney, Agent, or Firm*—Herbert Dubno

[57] ABSTRACT

For the production of a screen printing stencil, a foil is perforated in a regular pattern and then coated, so that the openings in the stencil are closed again. According to the desired pattern the coating material is again removed from the openings and for this purpose the foil is stretched and a laser ray is brought to bear upon the pertinent points according to the desired pattern.

5 Claims, 3 Drawing Sheets

PROCESS AND APPARATUS FOR THE PRODUCTION OF A SCREEN PRINTING STENCIL

CROSS REFERENCE TO RELATED APPLICATIONS

This application is a national phase application corresponding to PCT/86/00009 filed 27 Jan. 1986 and based upon an Austrian application A406/85 filed 12 Feb. 1985, which is a Division of Application Ser. No. 06/923,154 (pending), filed 10 Oct. 1986.

FIELD OF THE INVENTION

The invention relates to a process and an apparatus for the production of a screen printing stencil.

BACKGROUND OF THE INVENTION

Screen printing stencils can be produced by galvanoplastic means or by the formation of so-called photostencils. For this purpose, an already permeable surface array, e.g. a perforated foil or a screen fabric, for cylindrical stencils in form of a cylinder, is coated with a light-sensitive lacquer. After exposure to light of the pattern through a film superimposed over the light-sensistive lacquer layer and provided with the desired pattern, and subsequent development, one obtains a photo stencil whose apertures are partly closed by the hardened light-sensitive lacquer, and are partly permeable to ink. The production of such photostencils is very laborious. For each photostencil to be produced, a color separation pattern must be drawn, from which in the production of the film a line drawing must be prepared. Then the light-sensitive lacquer can be applied to the perforated foil. The coating of the foil must be done uniformly. After coating, the photo-sensitive lacquer is dried. In the meantime, after thoroughgoing inspection and retouching, the negative is converted in a contact frame to a halftone positive, which has the same size as the photostencil to be produced.

The inspection and exact cutting of the combined film in an exact height of repeat and width of master is a very significant and labor intensive procedure incidental to the production of the film.

One then stretches the completed combined film over the photostencil blank, and carry out the exposure The exposed stencil is then developed, and subsequently placed in a fusion chamber, whereby the light-sensitive lacquer hardens.

Subsequently, the stencil is again inspected and retouches. It can be seen that this procedure is very costly.

OBJECT OF THE INVENTION

It is the task of the invention to provide an improved process and apparatus for the production of photostencils where labor and thus cost are significantly reduced, but such that the accuracy of the stencil does not suffer.

SUMMARY OF THE INVENTION

In a process for the production of a screen printing stencil, in which a foil is perforated in a regular manner, the foil is then coated so that the perforations are closed, and finally from a portion of the perforations the coating material is removed again in accordance with a desired pattern, the process of the invention provides that the coated foil is stretched, if required after drying, and a laser beam is trained at the pertinent places of the coated foil corresponding to the desired pattern, to remove the coating and expose the perforations in those locations.

The apparatus for the production of a screen printing stencil, according to the invention, can comprise a stretching means for the foil and, in the plane parallel to the stretching means, guides for a laser optical system upon which a carrier carrying said laser optical system is movably disposed.

SPECIFIC DESCRIPTION

Figure 1:
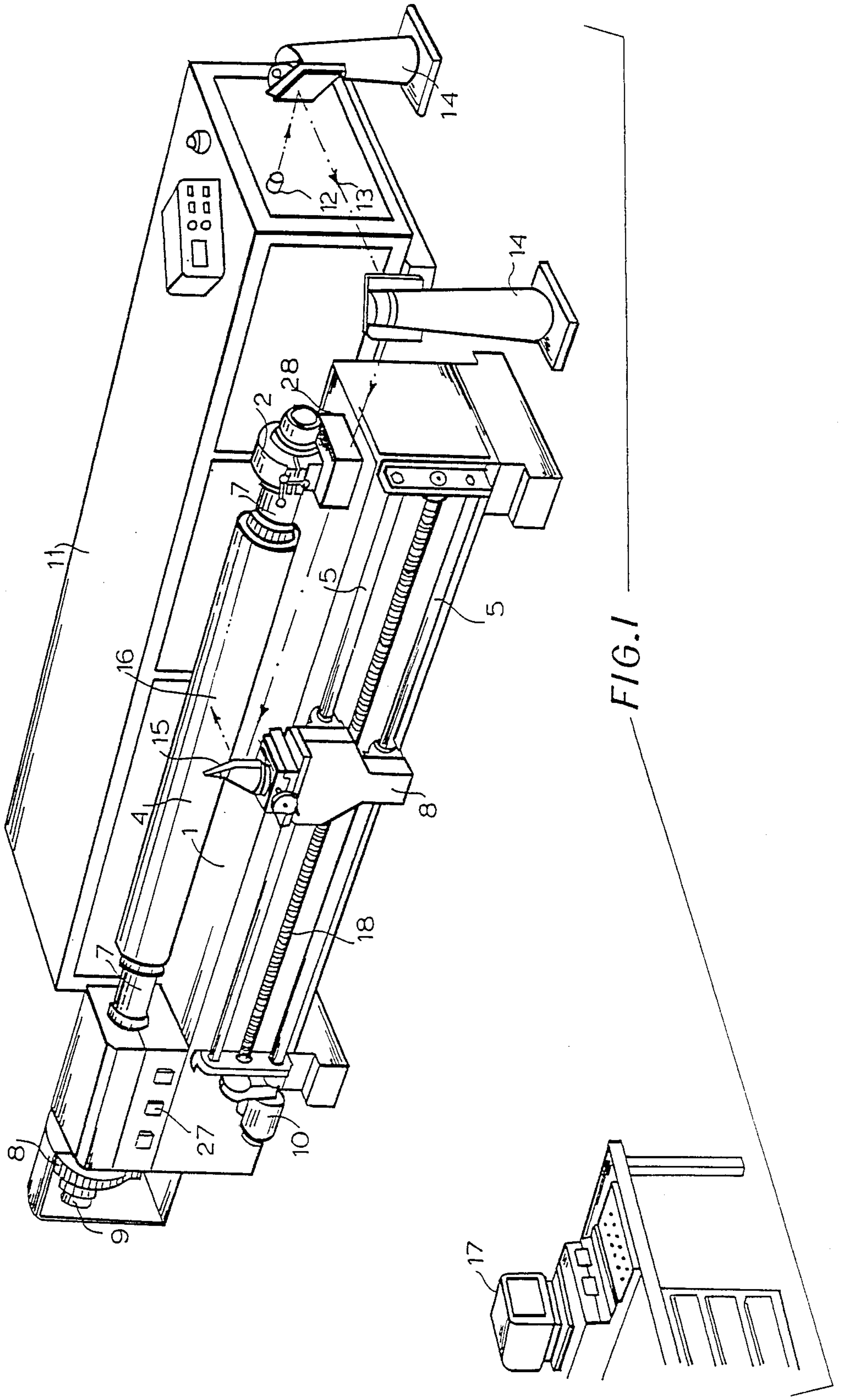
FIG. 1 shows schematically an apparatus according to the invention in isometric projection.

On base 1 which is stiff and resistant to bending and warping, bearings 2,3 are provided for a stencil stretcher drum 4.

Parallel to the axis of stencil stretcher drum 4, parallel guides 5 are provided for a guide carriage 6.

The control switches 27 of the apparatus are only illustrated in schematically.

The stencil stretcher drum 4 is a circular cylinder expandable in direction of its perimeter and running true when driven; the drum is supported only on one side during the mounting and removal of the stencils. It therefore is provided on both ends with carrier tubes 7.

For the stencil stretcher drum 4 a stretcher drum drive 8 is provided, which cooperates with a pulse generator 9. In FIG. 1, the stretcher drum drive 8 is shown as a gear drive. However, in order to avoid errors due to tooth tolerances, it is more advantageous to provide a flat belt drive as in FIG. 2 or 3, where a belt 19 is guided over two sheaves 20, 21.

A separate feed drive 10 is present for the guide carriage 6, suitably a stepping motor, whose stepping interval is chosen in such manner that a stepwise advance of the advancing carriage can be effected always in 10 $\mu$m (steps).

Figure 2:
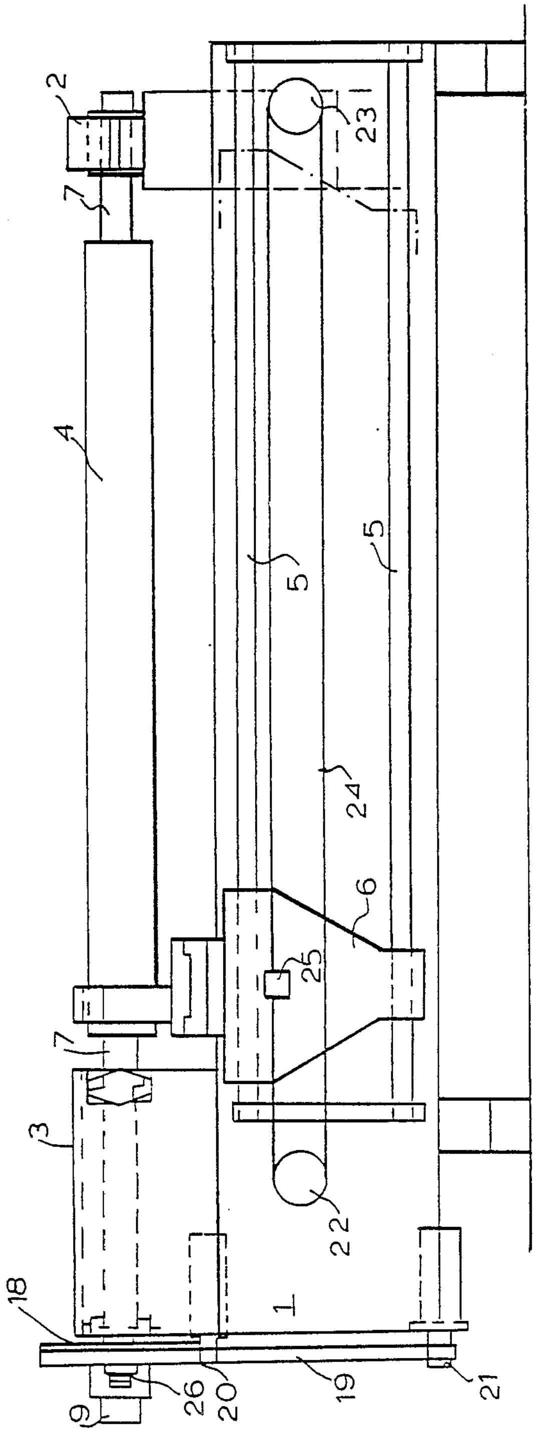
FIGS. 2 and 3 are elevational view of the stretch cylinder support.
Figure 3:
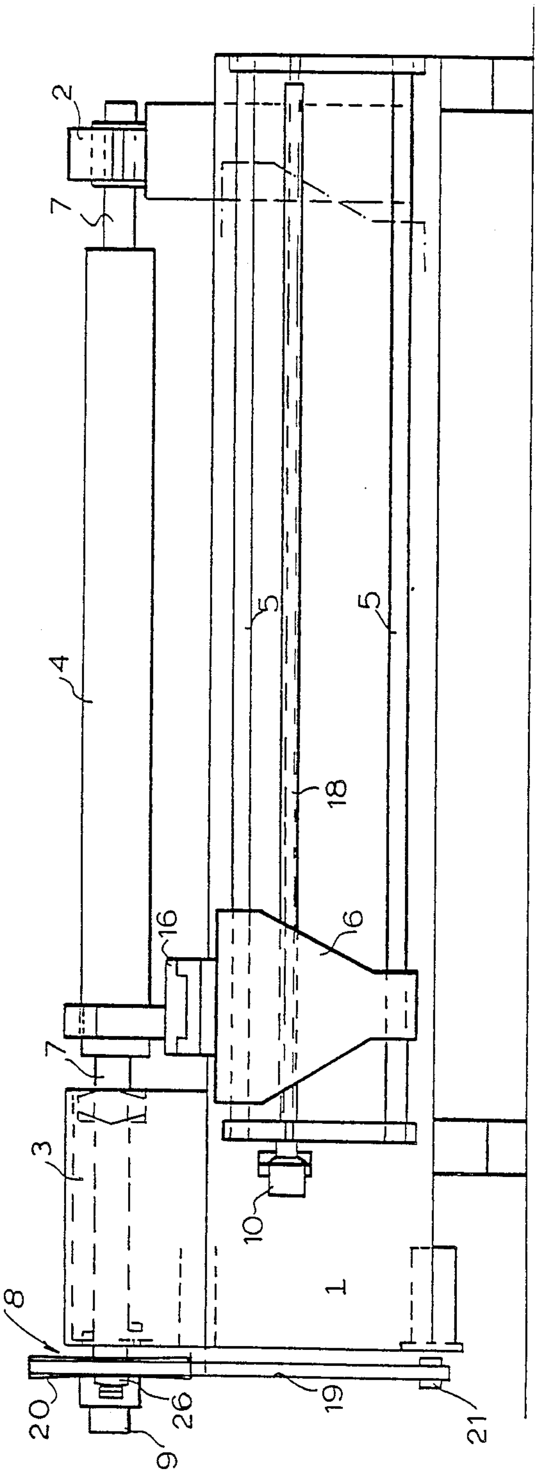

A stepping motor for the drive 10 is shown in FIGS. 1 and 3, where the stepping motor 10 drives a lead screw which engages guide carriage 6. In FIG. 2 a different embodiment for the feed drive is shown. Here an endless band 24 is guided via two drums 22, 23. This band 24 is anchored to the guide carriage 6 at 25. By driving of the drum 22 or 23, the guide carriage 6 is then moved correspondingly. It goes without saying that band 24 can also replaced by a draw cable.

A laser instrument 11 delivers a laser beam 13 at laser beam exit 12, the laser beam is guided via two deviating stations 14 and a deviating mirror 15 on guide carriage 6. For the adjustment of the position of the deviating mirror with repect to the stencil stretcher drum an adjusting cross slide 16 is provided. The deviating mirror 15 has the purpose of deviating the laser beam 13 guided parallel to the axis of the stencil into a direction perpendicular to the wall of the stencil.

The pattern to be applied to the stencil is transformed into control pulses; this transformation can be achieved either by scanning of a master, or by storage in an electronic device. These control pulses operate the laser instrument accordingly, and the laser beam 13 is thus trained pointwise upon the stencil on the stencil stretcher drum. At its point of impingement this laser ray effects a removal of the material covering the perforated foil, so that here the opening in the stencil is again laid bare. Thus the desired pattern can be transferred upon the stencil point for point and be means of common control of the laser instrument 11 and the guide carriage 6 a repetition of the pattern to be placed upon the stencil can also be attained in a simple manner.

The stencil stretcher drum 4 can be realized as a circular cylinder expandable in direction of the perimeter and running true when actuated. It goes without saying that care must be taken that the rotation of the stencil stretcher drum exhibits the smallest possible tolerances. On the side of the headstock, i.e. at the far left end of FIG. 1, the carrier tube 7 has a coupling which permits a connection to the pulse generator 9 in the sense of rotation without play and essentially rigid while the connection in the other direction is, however, a yielding and flexible connection. The coupling is illustrated at 26 in FIGS. 2 and 3. The tube 7 at the right-hand end can be received in a bearing 2, which is equipped with a pneumatic lowering device 28. The driving of the stencil stretcher drum 4 in the sense of rotation must be so arranged that only minimal asychronizations occur and that rotational and bending vibrations are kept extremely small and are well damped. Here one can chose driving via a friction wheel or a flat belt. The prime mover may be a commutator-less dc motor controlled as to speed of rotation, i.e. provided with a tachometer generator and an adjustable current limiter. In the design of the adjusting cross slide 16, it must be considered that the focal length of the laser optics can lie in a certain range, e.g between 20 and 100 mm, and it is therefore possible to retrofit a servo carriage which could readjust or reguide the optics in order to compensate for excessive running errors of stencil stretcher drum 4.

In FIG. 1 the laser beam 13 is shown in air between the various deviating elements. However, it is of course also possible to guide it within a telescope tube or the like.

I claim:

1. A process for producing a screen-printing stencil comprising the steps of:

mounting a foil perforated in a regular pattern on a stencil-stretching arrangement and coating said foil with a coating material blocking the perforations of said foil;

stretching said foil on said arrangement; and training a laser beam selectively at locations of said coating for removing said coating in a predetermined pattern to unblock perforations where the coating is removed.

2. The process defined in claim 1 wherein said foil is formed as a cylinder and is stretched circumferentially and a laser head is guided parallel to a generatrix of said cylinder and trained said laser beam perpendicularly thereon.

3. The process defined in claim 2 wherein said laser beam is generated by a laser beam generator and deflected to said head so that the laser beam lies parallel to said generatrix as it is fed to said head.

4. An apparatus for producing a screen-printing stencil comprising:

means for mounting a foil perforated in a regular pattern and provided with a stencil-stretching arrangement, said foil being coated with a coating material blocking the perforations of said foil;

means including said stencil-stretching arrangement for stretching said foil thereon; and means for training a laser beam selectively at locations of said coating for removing said coating in a predetermined pattern to unblock perforations where the coating is removed.

5. The apparatus defined in claim 4 wherein said means for training said laser beam comprises:

a guide extending parallel to said stencil-stretching arrangement and to a foil mounted thereon;

a carriage displaceable along said guide parallel to said foil and said stencil-stretching arrangement;

a head on said carriage for training said laser beam against said coating on said foil;

a laser source for generating said laser beam and provided with optics delivering said laser beam to said head; and a control unit operatively connected to said carriage and with said laser source for effecting control of said laser beam in accordance with said predetermined pattern.

* * * * *